United States Patent [19]
Edele

[11] 3,760,452
[45] Sept. 25, 1973

[54] WINDSHIELD WIPER MOUNTING ARM CONSTRUCTION FOR MOTOR VEHICLES

[75] Inventor: Reinhard Edele, Bietigheim-Metterzimmern, Germany

[73] Assignee: SWF-Spezialfabrik Fur Autozubehor Gustav Rau GmbH, Bietigheim, Germany

[22] Filed: Aug. 27, 1971

[21] Appl. No.: 175,544

[30] Foreign Application Priority Data
Oct. 24, 1970  Germany.................. P 20 52 354.0

[52] U.S. Cl. .............................. 15/250.35, 287/100
[51] Int. Cl. .............................................. B60s 1/34
[58] Field of Search.................... 15/250.35; 287/96, 287/14, 100; 74/251 R

[56] References Cited
UNITED STATES PATENTS

| | | | |
|---|---|---|---|
| 3,099,030 | 7/1963 | Zury ...................... | 15/250.35 |
| 3,126,568 | 3/1964 | Wubbe..................... | 15/250.35 |
| 3,188,679 | 6/1965 | Wubbe..................... | 15/250.35 |

FOREIGN PATENTS OR APPLICATIONS

| | | | |
|---|---|---|---|
| 953,514 | 5/1949 | France ............................. | 74/251 R |
| 1,180,177 | 2/1970 | Great Britain................... | 15/250.35 |

*Primary Examiner*—Andrew V. Kundrat
*Attorney*—John J. McGlew et al.

[57] ABSTRACT

A windshield wiper arm includes a headpiece with a receiving bore which is adapted to be positioned over the wiper bearing and to be rotatably engaged therewith. A hinge part is pivotally connected to the outer end of the headpiece by means of a hinge rivet construction and the hinge part is urged in a direction toward the windshield by a pressure spring which extends from a wiper arm rod portion under the hinge part to a fixed bolt on the headpiece and below the hinge rivet. The hinge part includes inwardly tapering frustoconcial bearing flange recesses which include walls engaged around the heads at the respective opposite ends of the hinge rivet. The rivet has a shank portion which passes through openings at the inner end of the recesses. The frusto-conical bearing flanges, which are inclined in respect to the longitudinal pivot axis of the rivet, are locked between inclined surfaces of a bearing bush which is attached to the hinge rivet and which rotates in surrounding bushes carried in the headpiece.

1 Claim, 2 Drawing Figures

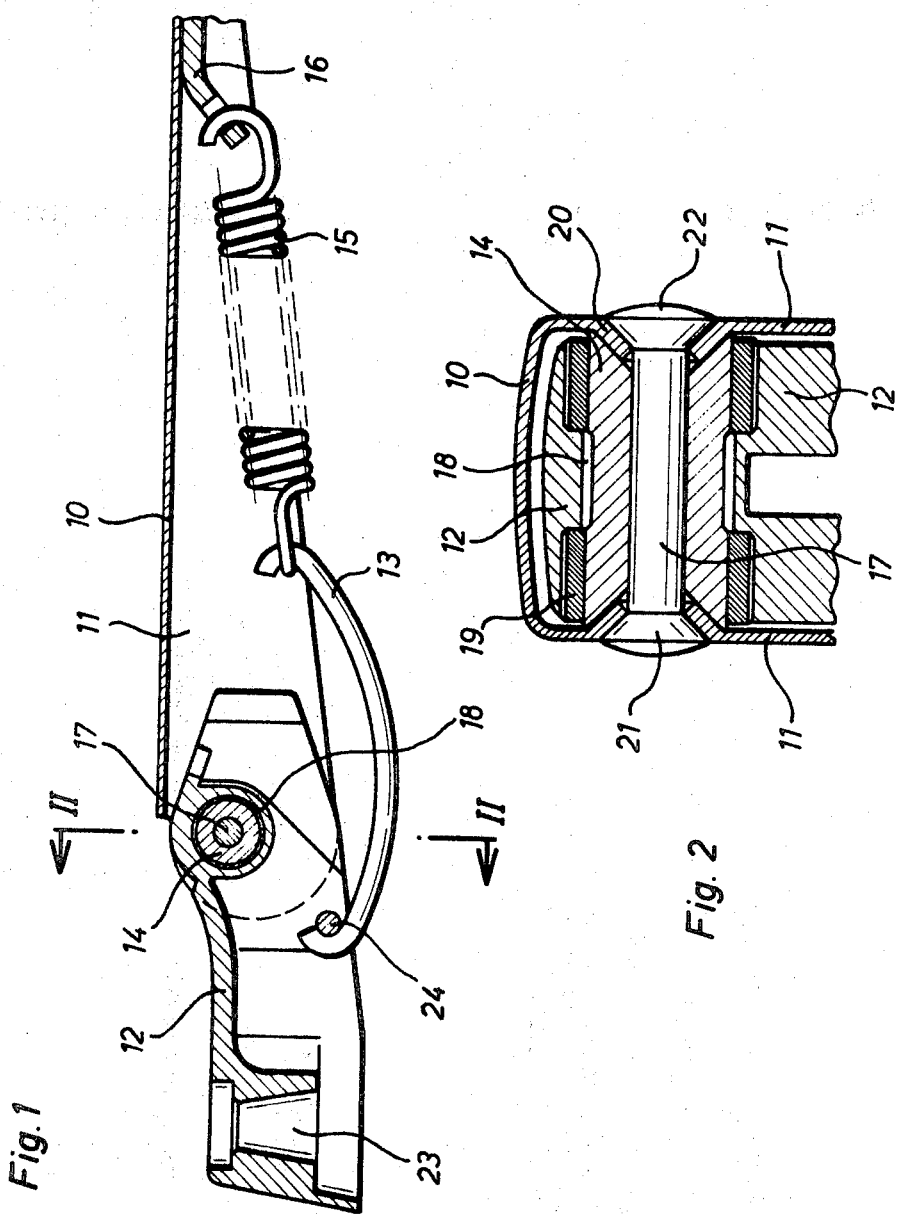

WINDSHIELD WIPER MOUNTING ARM CONSTRUCTION FOR MOTOR VEHICLES

BACKGROUND OF THE INVENTION

1. Field of the Invention

This invention relates in general to the construction of windshield wipers and, in particular, to a new and useful windshield wiper arm for motor vehicles, having a hinge rivet joint between a hinge part of a wiper arm and a headpiece of the wiper bearings.

2. Description of the Prior Art

A hinge rivet joint is necessary in order that the wiper arm can be lifted on the headpiece of the wiper bearing perpendicularly to the wiping field and that it be capable of performing, during the wiping over the greatly curved windshields of the present day, a compensating movement in this direction. The hinge part of the wiper arm protatably mounted on the headpiece of the wiper bearing carries two side arms with bores for receiving the hinge rivet. During the wiping movement, great transverse forces appear which effect canting of the hinge rivet joint. The side arms of the hinge part of the wiper arm are pressed unequally against the hinge rivet. Since the bearing surfaces between the side arms and the hinge rivet which are provided for transmitting the force are small, a so-called rivet bearing appears, in the course of the operation due to the radial load in the range of the rivet receivers, and this leads to inadmissible play of the hinge rivet joint. Due to this increased play, the wiping pattern is greatly imparied and the running noises increase considerably.

SUMMARY OF THE INVENTION

In accordance with the present invention, an improved wiper arm is provided for motor vehicles, which is constructed so that no deflection can be effected on the hinge rivet joint by the transverse tipping moments between the hinge part of the wiper arm and the headpiece of the wiper bearing.

The windshield wiper arm for motor vehicles with a hinge rivet joint between the hinge part of the wiper arm and the headpiece of the wiper bearing is characterized, in accordance with the invention, by a construction in which the side arms of the hinge part of the wiper arm, in the range of the rivet receiver, carries an inwardly bent off bearing flange or frustoconical bearing flanges at each end which rotatably support the conical heads of the rivet extending through this part. The rivets are locked between the inclined surfaces of the bearing flange surrounding the heads of the rivet. The transverse tipping moment of the wiper arm is divided in this hinge rivet joint into two components, one of which loads the hinged rivet joint radially, and the other loads it axially. The component determinant for the rivet bearing can therefore be greatly weakened so that the deflection of the hinge rivet joint is prevented.

A good and uniform distribution of forces is obtained according to one embodiment by forming the bearing flanges on each end of the hinge part with frustoconical recesses which define walls which engage in a form-fitting manner with the rivet heads at each end of the rivet so that the bearing flanges extend over the full circumference of the rivet heads. The distribution of forces is thus dependent of the deflection of the wiper arm transverse to the wiping field.

An excellent pivot bearing between the hinge part of the wiper arm and the headpiece of the wiper bearing is obtained by locking the bearing bush by a press-fit on the hinge rivet and mounting it rotatably in another bearing bush which is locked non-rotatably in the headpiece of the wiper bearing. The bearing bush which is locked in the headpiece of the wiper bearing can be divided into two partial bushes between which the headpiece of the wiper bearing and the bearing bush locked on the hinge rivet form a lubricating chamber.

Accordingly, it is an object of the invention to provide an improved wiper arm construction for windshield wipers of motor vehicles which includes a headpiece having a receiver which is adapted to be engaged over the wiper bearing and which pivotally supports a hinge part on a rotatable rivet which is supproted by heads at each end on similarly shaped recess bearing portions of the hinge part and which is rotatable with a bearing bush, which is turn is rotatably supported on a fixed bush held by the headpiece.

A further object of the invention is to provide a windshield wiper arm construction which is simple in design, rugged in construction, and economical to manufacture.

The various features of novelty which characterize the invention are pointed out with particularity in the claims annexed to and forming a part of this disclosure. For a better understanding of the invention, its operating advantages and specific objects attained by its uses, reference should be had to the accompanying drawing and descriptive matter in which there is illustrated a preferred embodiment of the invention.

BRIEF DESCRIPTION OF THE DRAWING

In the Drawing:

FIG. 1 is a longitudinal sectional view of a windshield wiper arm constructed in accordance with the invention; and FIG. 2 is a section taken along the line II—II of FIG. 1.

GENERAL DESCRIPTION OF THE PREFERRED EMBODIMENT

Referring to the drawing in particular, the invention embodies therein, comprises a windshield wiper arm construction which includes a headpiece 12 which has a recess or bore 23 for receiving a wiper bearing which is adapted to be connected to the headpiece for rotating or oscillating the headpiece backwardly and forwardly. A hinge part of the wiper arm is connected to the headpiece through a hinge rivet or pivot pin 17 having heads 21 and 22 at respective ends. The hinge part 10 carries a wiper arm rod 16 which carries a pressure spring 15 which is engaged with the arm and with a stirrup 13. The stirrup in turn is engaged around a fixed pin or bolt 24 of the headpiece and the spring 15 thus urges the arm to rotate in a clockwise direction in respect to the hinge rivet 17 and toward the wiping planes.

In accordance with a feature of the invention, the side arms or side walls of the hinge part 10 include frusto-conical recesses or bearing flanges which are disposed at an angle of 45° to the axis of the rivet and engage with head parts 21 and 22 of the rivet 17 and lock the rivet in an axially fixed position. As shown in FIG. 2, the side arms of the hinge part 10 are tapered inwardly in the range of the rivet heads and form circumferential bearing flanges 20. These bearing flanges 20 are locked between correspondingly inclined end faces of a bearing bush 14 and the abutting surfaces of the rivet head 21 and the closing rivet head 22. The bearing bush 14 is secured non-rotatably on the hinge rivet 17 by a press-fit.

The bearing bush 14 is also rotatably mounted in the two partial bushes 19 which are carried by the headpiece 12. The bearing bushes 19 fit into opposite ends of the headpiece and are held in position against rotation by suitable spline elements. Between the two partial bushes 19, the headpiece 12 and the bearing bush 14, secured on the hinge rivet 17, are offset from each other and form a circumferential lubricating chamber 18.

If the hinge part 10 is loaded by lateral tipping moments, a distribution of forces is carried out over the inclined bearing flanges 20. One part acts radially and the other part acts axially on the hinge rivet 17. Since in addition, the working surface is also increased over the inclined bearing flanges 20, a deflection of the hinge rivet joint is positively prevented, particularly since the resulting force component is already greatly weakened. The axial force component is readily abosrbed by the hinge rivet 17.

While a specific embodiment of the invention has been shown and described in detail to illustrate the application of the principles of the invention, it will be understood that the invention may be embodied otherwise without departing from such principles.

What is claimed is:

1. A windshield wiper arm for motor vehicles which has a windshield wiper bearing which is rotatable or oscillatable, comprising a headpiece having a recess forming a wiper bearing receiver for engaging the wiper bearing for movement therewith, a hinge part pivotally mounted on said headpiece for movement toward and away from the wiping plane and having opposite side walls with inwardly extending portions forming annular bearing flanges, a rivet extending between said side walls and having a shank portion with a head at each end engaged inwardly against the respective bearing flanges of the opposite side walls, and a rivet bearing bush secured around said shank portion of said rivet and locked between the interior of said bearing flanges and rotatably supported in said headpiece, bearing bush means on said headpiece rotatably supporting said rivet bearing bush, said bearing bush means comprising two spaced cylindrical bearing bushes each received within a cylindrical counter bore in said headpiece and of an axial length equal to that of its respective bearing bush, said receiver having a central shoulder in said head defined by said counter bores and extending between said separated bearing bushes but being spaced from said rivet bearing bush to define an annular lubricant chamber therearound.

* * * * *